RINGING AND SIGNALING CURRENT SUPPLY FOR TELEPHONE SYSTEM

Filed July 3, 1953 4 Sheets-Sheet 1

INVENTORS J. K. MILLS
W. S. ROSS
BY A. J. Kane
ATTORNEY

RINGING AND SIGNALING CURRENT SUPPLY FOR TELEPHONE SYSTEM

Filed July 3, 1953 4 Sheets-Sheet 2

INVENTORS J. K. MILLS
W. S. ROSS
BY
A. F. Kane
ATTORNEY

INVENTORS J. K. MILLS
W. S. ROSS
BY G. F. Kane
ATTORNEY

April 3, 1956 J. K. MILLS ET AL 2,740,845

RINGING AND SIGNALING CURRENT SUPPLY FOR TELEPHONE SYSTEM

Filed July 3, 1953 4 Sheets-Sheet 4

INVENTORS J. K. MILLS
W. S. ROSS
BY
A. F. Kane
ATTORNEY

United States Patent Office 2,740,845

Patented Apr. 3, 1956

2,740,845

RINGING AND SIGNALING CURRENT SUPPLY FOR TELEPHONE SYSTEM

John K. Mills, Morristown, N. J., and Walter S. Ross, Port Washington, N. Y., assignors to Bell Telephone Laboratories, Incorporated, New York, N. Y., a corporation of New York Application July 3, 1953, Serial No. 365,898

6 Claims. (Cl. 179—84)

Figures 1, 5, 6:
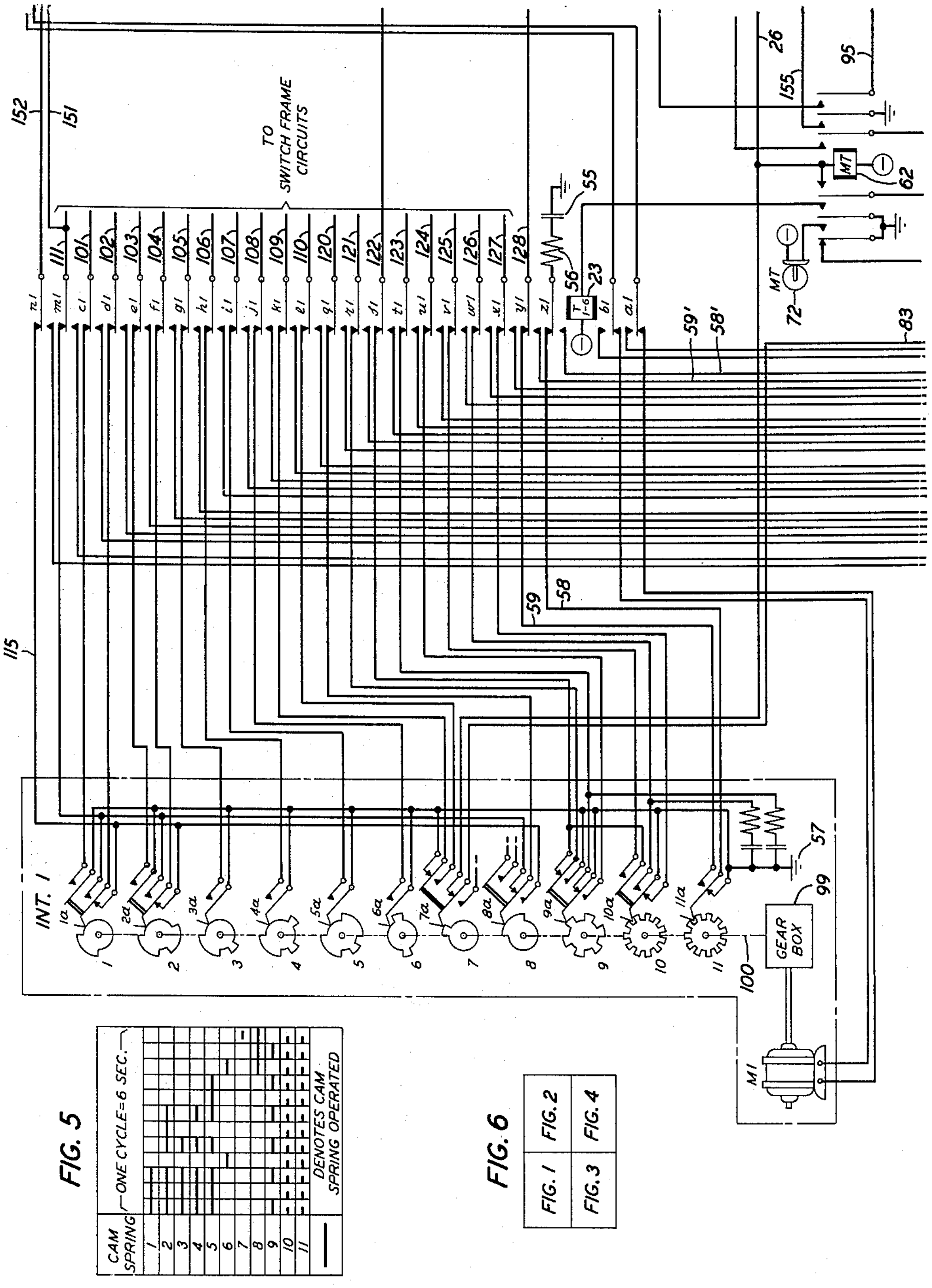

This invention relates to power supply systems and particularly to code ringing and tone supply systems of the type used extensively in the telephone plant.

Supply systems of the type to which this invention relates function in the telephone plant to furnish ringing current at voltages required by the particular exchange served thereby; interrupted ringing current and ground potential at proper intervals for funishing code signals for multiparty selective and/or semiselective ringing; interrupted ground potential for signaling; and tone and other signal sources required by the exchange. A system of this character is disclosed in United States Patent 2,694,-106 of November 9, 1954, which resulted from a copending application, Serial No. 216,957, filed March 22, 1951 by J. K. Mills, now Patent No. 2,694,106.

In such systems heretofore, and particularly in the supply system disclosed in the above-identified copending application, the power plant comprises a ringing current generator, a tone generator, a regular interrupter and a standby or spare interrupter as well as an auxiliary power source. In the normal operation of such a plant the current outputs of the ringing and tone generators, which are of the static converter type, are fed directly, or by way of interrupter-controlled contact springs in accordance with the signal codes required of the exchange, to the switch frame circuits at the exchange. In order to insure a substantially continuous supply of the required ringing codes and tones, provision is made to permit the spare interrupter to be substituted for the regular interrupter in the event of an emergency condition involving the failure of the regular interrupter and also to automatically transfer the load to the spare power source in the event of failure of the regular commercial source on which the plant operates.

It is the object of this invention to increase the flexibility of and to otherwise improve code ringing and tone supply systems of the type disclosed in the above-identified copending application.

In accordance with a particular feature of the supply system of this invention, spare ringing and tone current generators as well as spare interrupters are employed and circuit controls are provided for effecting the substitution of the spare generator and interrupter units, separately, for the corresponding regular units in the event of failure of either of the latter.

More particularly, and in accordance with other features, the code ringing and tone supply system of this invention functions to furnish ringing current at voltages required by the telephone exchange involved; to provide interrupted ringing current and ground at the proper intervals for furnishing five code—ten party or eight party semiselective ringing; to provide interrupted ground for signaling; to provide the tones required by the particular exchange; to transfer automatically from commercial power supply to a battery-driven inverter in case of service power failure, with automatic transfer back when the commercial power supply again becomes available; to transfer automatically to a spare interrupter in case of failure of the regular interrupter; to transfer to spare ringing and tone generators in case of failure of the regular ringing or tone generators; to provide means of transferring to the spare ringing and tone generators and the spare interrupter and restoring to normal by dialing assigned numbers; to provide means of transferring to the spare ringing and tone generators after an automatic transfer of interrupters, or vice versa; and to provide suitable alarm and guard signals.

The following description is made with reference to the accompanying drawings, in which:

Figs. 1, 2, 3 and 4 when combined in the manner shown in Fig. 6 constitute a diagrammatic representation of the circuits and apparatus involved in the code ringing and tone supply system of this invention, and Fig. 5 is a chart showing the closed and open intervals of the spring pile-ups controlled by the interrupter cams during one complete revolution of the shaft thereof.

Figure 3:
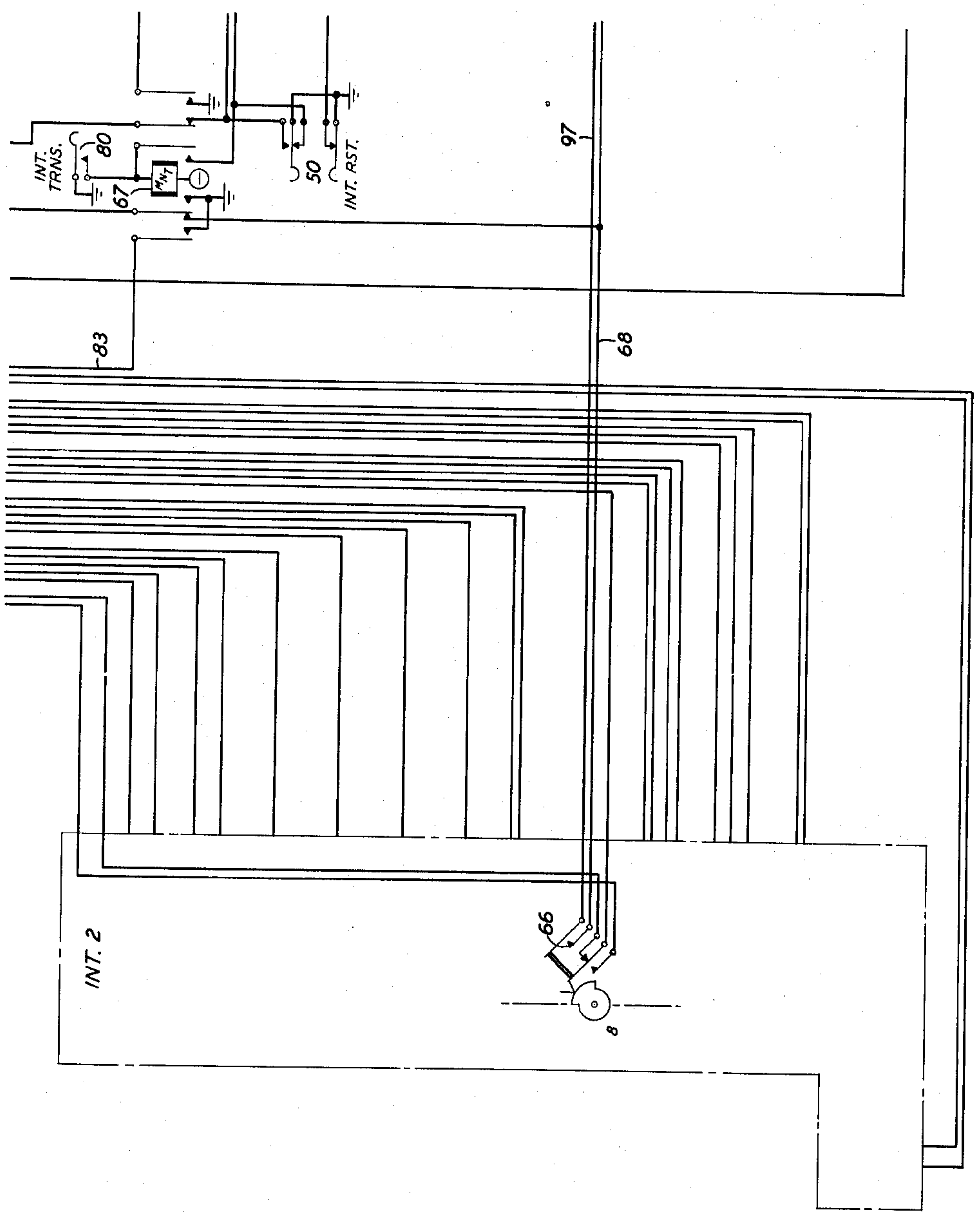

Referring to Figs. 1 and 3, the apparatus enclosed within the broken line box designated INT1 in Fig. 1 represents a motor-driven interrupter, the shaft 100 of which is revolved at the rate of one revolution every six seconds by means of a motor M1 operating through a reduction gearing indicated at 99. The slow speed shaft 100 of interrupter INT1 has fixedly mounted thereon a series of cams 1–11, each of which controls an individual set of contact springs or spring pile-ups. Similar equipment is contained in but not wholly illustrated in the broken line box INT2 of Fig. 3. This latter equipment constitutes what hereinafter is referred to as the spare or secondary interrupter whereas that shown in Fig. 1 is designated the regular or primary interrupter. Relay 23 shown in Fig. 1 controls a multiplicity of armatures and their front and back contacts. These armatures serve to connect the output conductors of interrupters INT1 and INT2 to the "switch frame circuits" X shown at the upper right of Fig. 1. It will be understood that the armature load, in practice, is distributed among a greater number of relays similar to relay 23, but the drawing is limited to one such relay for the sake of simplicity of disclosure.

Figure 2:
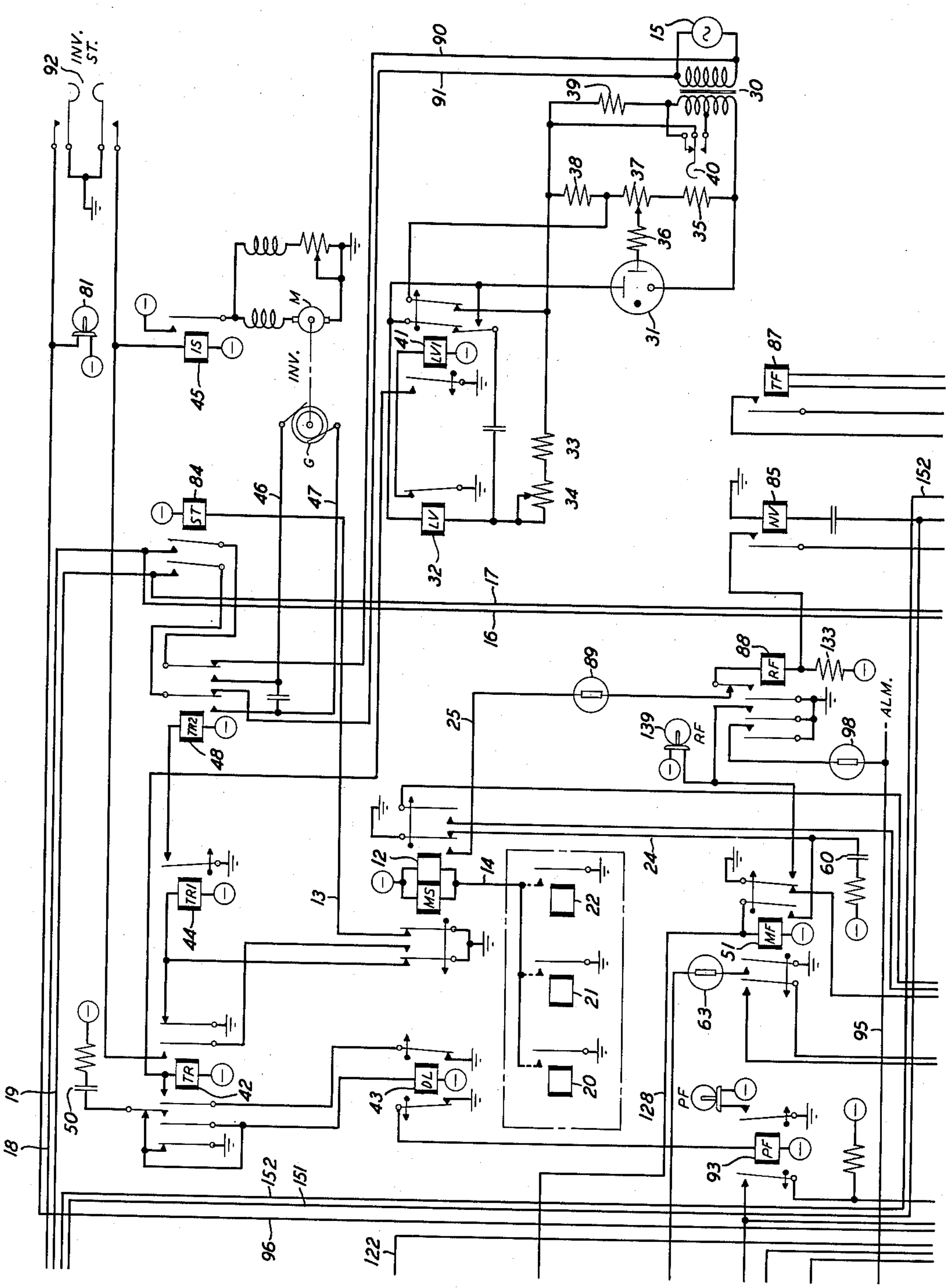

Fig. 2 discloses circuits and apparatus having to do particularly with the manner in which the supply system is started functioning upon demand by the exchange equipment, and illustrates also a motor-driven inverter INV which is brought into service automatically, in the event of the failure of the regular service supply, under control of a voltage control circuit involving the vacuum tube 31. This control circuit, of itself, constitutes no part of the present invention; it is disclosed in United States Patent 2,197,868, issued April 23, 1940 to C. S. Knowlton. Relays 20, 21 and 22 represent those relays of a line finder, selector and connector, respectively, which operate at various stages of a telephone connection to initiate the operation of the supply equipment and to maintain it operating.

Figure 4:
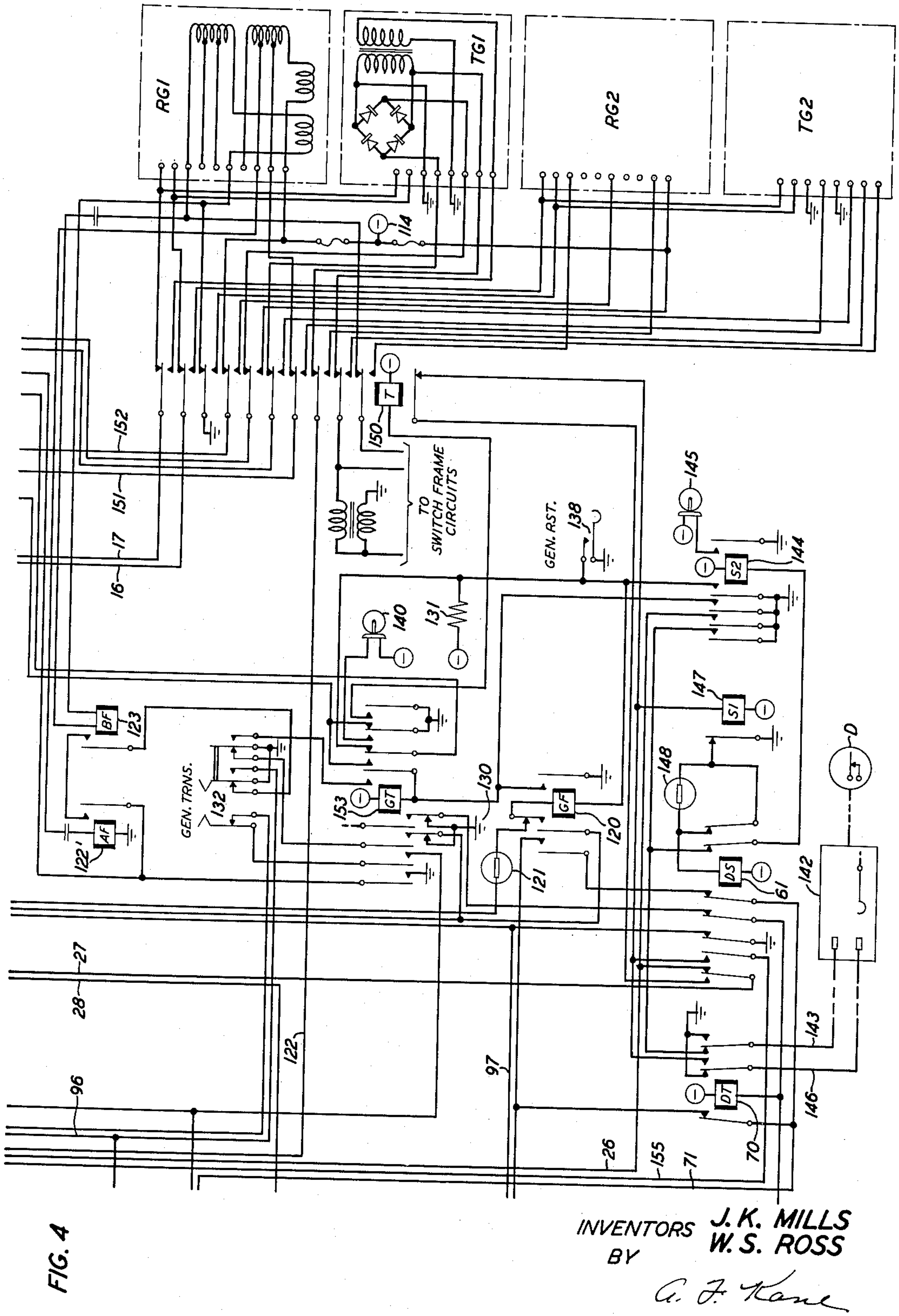

To the extreme right of Fig. 4 are shown schematically the ringing current generator RG1 and the tone generator TG1 of the regular supply unit and the ringing current generator RG2 and the tone generator TG2 of the spare unit. These generators are static converters of any suitable design, the tone generators preferably being of the type disclosed in United States Patent 2,277,809, issued March 31, 1942 to L. R. Wrathall. Fig. 2 shows a relay 51 which is maintained operated, while shaft 100 of the primary interrupter INT1 revolves, under control of the interrupter cam 11 and condensers 55 (Fig. 1), and 60 and which responds to the failure of this interrupter to revolve to effect a transfer of the load from interrupter INT1 to interrupter INT2. This feature constitutes subject-matter of the hereinbefore-identified J. K. Mills application.

The interrupters INT1 and INT2 are identical and, by way of illustration, are shown to include eleven spring pile-ups and their associated cams 1–11, inclusive. It is to be understood that the cams and spring pile-ups may be fewer or greater in number than eleven and may take forms other than those shown depending upon the requirements to be met at the telephone exchange.

Interrupter springs 1a function under control of the corresponding cam 1 to apply ground potential at 57 (Fig. 1) to conductor 101 by way of the back contact and armature *c*1 of relay 23 and the upper make contacts of pile-up 1a for a period of one and one half seconds for each complete cycle of six seconds, and, during the same interval, to apply superimposed battery 114 (Fig. 4) and ringing current from the output of generator RG1 to conductor 102 by way of the armature *d*1 of relay 23 and its back contact, back contact and armature *m*1 of relay 23, conductors 111 and 151, the No. 10 armature and back contact of relay 150, through RG1 to the battery 114. During the balance of the six second period, or for four and one half seconds, battery 114 (Fig. 4) is connected to conductor 102 by way of conductor 115, armature *n*1 and the associated back contact of relay 23, conductor 152, the No. 7 armature and associated back contact of relay 150.

Interrupter springs 2a function under control of the associated cam 2 to supply two spurts of ground potential from 57, each of one and one half seconds duration spaced by an interval of one half second, to conductor 103 by way of the back contact and armature *e*1 of relay 23 during each complete cycle; during the same intervals superimposed battery 114 and ringing current from generator RG1 are supplied to conductor 104 by way of armature *f*1 of relay 23 and the associated back contact, back contact and armature *m*1 of relay 23, conductor 151, the No. 10 armature and associated back contact of relay 150 to battery 114 by way of generator RG1; during the remaining one half and two and one half seconds intervals of the cycle battery at 114 is connected to conductor 104 by way of armature *f*1 of relay 23 and the associated back contact, innermost contacts of spring pile 2a, conductor 115, back contact and armature *n*1 of relay 23, conductor 152, and the No. 7 armature of relay 150 and its associated back contact.

Interrupter cam 3 and its associated springs 3a cooperate to apply to conductor 105, by way of armature *g*1 and the associated back contact of relay 23 two spurts of ground potential during each complete cycle, the first spurt being of a duration of one and one half seconds and spaced one half second from the second spurt which is of one half second duration; during the remaining three and one half seconds conductor 105 is held open.

Interrupter cam 4 and its associated springs 4a function to apply to conductor 106, by way of the back contact and armature *h*1 of relay 23, three spurts of ground potential during each complete cycle, one of one and one half seconds duration and each of the two others of one half second duration with a one half second interval between spurts; during the remaining two and one half seconds conductor 106 is held open.

Interrupter cam 5 and its associated contact springs 5a function to apply to conductor 107, by way of the back contact and armature *i*1, three spurts of ground potential, the first of one and one half seconds duration and spaced one half second from the second spurt which is of one half second duration and, in turn, spaced one half second from the third spurt which is of one and one half seconds duration; during the remaining one and one half seconds conductor 107 is held open.

Interrupter cam 6 and its associated contact springs 6a function to supply conductor 108, by way of the back contact and associated armature *j*1 of relay 23, two spurts of ground potential each of one half second duration and spaced by a time interval of two and one half seconds.

Certain of the functions of cam 7 and its associated spring pile-up 7a appear from the description of the operation of the system to be made hereinafter. It is apparent that the springs controlled by cam 7 are operated for about one quarter second in each cycle. It is also apparent that for one quarter second of the cycle ground at 57 is connected to conductor 109 by way of armature *k*1 and the associated back contact of relay 23, and for the remaining five and three quarters seconds of the cycle conductor 109 is connected to conductor 110 over armatures *k*1 and *l*1 of relay 23 and their respective back contacts.

Interrupter cam 8 and its contact springs 8a serve to apply to conductor 120, superimposed battery 114 and ringing current from generator RG1 for an interval of one and one half seconds during each cycle, this circuit involving the back contact and No. 10 armature of relay 150, conductors 151 and 111, armature *m*1 and the associated back contact of relay 23, middle contacts of spring pile-up 8a and the back contact and associated armature *q*1 of relay 23; during the remaining four and one half seconds of the cycle conductor 120 is connected to battery 114 by way of the lowermost contacts of spring pile-up 8a, conductor 115, back contact and armature *n*1 of relay 23, conductor 152 and the No. 7 armature and back contact of relay 150.

The interrupter springs 9a controlled by cam 9 operate and release alternately six times during one complete cycle, each operation and release interval consuming one half second. During the intervals in which the springs are operated (illustrated) low tone is connected to conductor 121 in a circuit which includes armature *r*1 and the associated back contact of relay 23, the outermost contacts of spring pile-up 9a, back contact and armature *s*1 of relay 23, conductor 122, the No. 11 armature and back contact of relay 150 to the low tone terminal of generator TG1; also during the same intervals ground at 57 is connected to conductor 123 by way of the middle contacts of spring pile-up 9a, back contact and armature *t*1 of relay 23. During the alternate intervals ground at 57 is connected to conductor 124 by way of the innermost contacts of spring pile-up 9a and the back contact and armature *u*1 of relay 23. Ground at 57 is also connected to conductor 121 by way of the upper transfer contact of spring pile-up 9a and the back contact and armature *r*1 of relay 23.

Interrupter cam 10 interrupts its associated contact springs 10a at the rate of 120 times a minute causing low tone from the source TG1 to be applied at the same rate to conductor 125, the path from the tone source extending from the low tone terminal at TG1 over the back contact and armature 11 of relay 150, conductor 122, armature *s*1 and the associated back contact of relay 23, outermost contacts of spring pile-up 10a and the back contact and armature *v*1 of relay 23; similarly, ground at 57 is applied at the same rate to conductors 126 and 127 by way of the interrupter spring contacts and the back contacts and armatures *w*1 and *x*1 of relay 23, it being apparent that when ground is being applied to one of the conductors 126 or 127 it is being disconnected from the other conductor.

The interrupter cam 11 operates its spring pile-up at the rate of 120 times per minute to alternately connect the condenser 55 to ground and to one terminal of the winding of relay 51 by way of the back contact and armature *y*1 of relay 23 and conductor 128 for a purpose to be set forth in detail hereinafter.

*Normal operation*

In normal operation and when no telephone calls are in progress at the exchange, "start" relay 84 (Fig. 2) is held operated in a circuit extending from negative battery, through the winding of relay 84 over conductor 13, back contact and inner left armature of relay 12, to ground. Under this condition the ringing and tone current generators and the interrupters are inactive. When ringing current, tones or ground pulses are required by the switching circuits at the telephone exchange, ground potential is connected to conductor 14 in a manner to be described presently. It will be understood, for the purpose of this description, that the ringing equipment illustrated is associated with a so-called community office or automatic exchange of the step-by-step type and that the designations 20, 21 and 22, as hereinbefore indicated, represent well-known relays present in such an exchange which are operated in response to the origination to a telephone call at a subscriber's station and to subsequent steps incident to the completion of a telephone connection.

Upon the arrival of a call at the dial exchange the above referred to relay 20 in a line finder operates to start the finder searching for the calling line as is well understood in the art. In operating, relay 20 connects ground to the "motor start" conductor 14 which causes relay 12 to operate over an obvious circuit. The ground potential on conductor 14 is maintained by other relays 21 and 22 in the selector and connector, respectively, as the call progresses and is not removed until the called subscriber answers, or the call is abandoned.

Relay 12, operated, opens the operating circuit to relay 84 causing this relay to release its armatures. At its armatures and back contacts relay 84 completes connections from the alternating-current service supply 15 to the ringing current and tone generators RG1 and TG1, by way of conductors 16 and 17, and to the regular interrupter INT1 by way of conductors 18 and 19, it being observed at this time, that relay 23 is assumed to be in its unoperated condition as illustrated, so that conductors 18 and 19 are extended to the motor M1 by way of the armatures *a*1 and *b*1 and their associated back contacts.

Relay 12 at its inner right armature and back contact removes ground potential from conductor 24 and at the associated front contact connects ground to conductor 25 for purposes to be described hereinafter.

Interrupter INT1 functions under control of motor M1 and together with ringing generator RG1 and tone generator TG1 make available to the exchange circuits, by way of conductors X, machine ringing, tones and other code signals.

When ringing current, tones, etc., are no longer required, ground potential is removed from conductor 14 causing relay 12 to release. Upon restoring its armatures, relay 12 causes relay 84 to reoperate and to disconnect the alternating-current source 15 from the ringing current and tone generators RG1 and TG1 and from motor M1 of the interrupter INT1.

*Automatic transfer to inverter INV on power service failure*

Transformer 30, Fig. 2, tube 31, relay 32 and resistances and potentiometers 33, 34, 35, 36, 37 and 37*a* and 38 form a circuit which is adjusted to cause relay 32 to release when the primary voltage at the transformer, that is the voltage of the power source 15, is approximately 85 percent of normal value. Resistance 39 is provided to prevent release of relay 32 during the open period of the contacts of the adjusting key 40 when the key is being operated. Under normal power service voltage conditions, the voltage applied to the control gap of the tube 31 by potentiometer 37 and resistance 36 is sufficient to cause this gap to fire on each positive half cycle. This causes the main gap of the tube to fire and furnish current for the operation of relay 32. Relay 32, operated, holds relay 41 operated.

When the power service voltage falls below 85 percent of normal value, the control gap of tube 31 will not have sufficient voltage across it and will cease to fire as will also the main gap, with the result that relay 32 will release, in turn, releasing relay 41.

Relay 41 at its outer right armature opens a short circuit across resistance 38 in the control gap potentiometer so that the tube 31 will fire again at a voltage at about 5 percent above the release voltage value. At its outer left armature relay 41 completes an obvious energizing circuit for relay 42 which relay thereupon operates and locks to ground by way of its own front contact and innermost left armature and the right front contact and associated armature of relay 43. Relay 43 is normally held operated in a circuit to ground at the back contact and outermost left armature of relay 42.

Relay 42 at its outer right armature and back contact removes ground from the winding of relay 44, which relay, however, remains operated under the control of the outer left armature and back contact of relay 12. At its inner right armature and front contact relay 42 prepares an operating circuit for relay 45 which is open at the front contact and outer left armature of relay 12 so that, whenever relay 12 operates incident to the operation of such telephone switching relays as 20, 21 and 22, relay 45 will operate and start the inverter INV. The inverter is started by the connection of battery at the armature and front contact of relay 45 to the field and armature windings of the direct-current motor M which motor drives the alternating-current generator G in well-known manner.

The output leads 46 and 47 of generator G are connected to the two front armature contacts of relay 48, which relay remains released until relay 44 restores its armature incident to the operation of relay 12 which occurs when such relays as 20, 21 and 22 operate to indicate the need for ringing and/or tone currents by the telephone switching circuits.

When relay 12 does operate, relay 44 is released and causes the completion of the operating circuit for relay 48. With relay 12 operated, relay 84 is released and the output leads 46 and 47 from generator G are substituted for the power leads 90 and 91 associated with the power service supply 15 so that the alternating-current load is now taken over by generator G.

Relay 44 is made slow releasing in order to delay the load transfer until the inverter INV has attained full speed. Relay 42, operated, removes ground from the winding of relay 43, so that when the condenser 50 has discharged, relay 43 will release. This condenser discharge delays the release of relay 43 for about 15 seconds, so that when once operated, relay 42 will not release for this period of time even though relays 32 and 41 have reoperated during this period. The purpose of the delay is to prevent unnecessary transfers back to the main source 15 during momentary restorals of service voltage after a service failure.

*Manual start of inverter INV*

The inverter INV may be started manually by operating the inverter start key 92. This operation causes relay 45 to operate over an obvious circuit to start the inverter but does not connect the load to it. It also causes the lighting of guard lamp 81 in an obvious circuit as a warning signal.

*Ringing current or tone generator transfer—automatic*

When there is no ground on the start lead 14, relay 120 (Fig. 4) can not operate since the ground at 130 through the thermistor 121 is opened at the outer right armature and front contact of relay 12. When "motor start" ground is applied to the lead 14, relay 12 operates, as previously described, and connects ground to thermistor 121 but the operation of relay 120 is delayed by the thermistor until relays 122, 123 and 87 have operated because of the activation of the ringing and tone generators RG1 and TG1. The armature contacts of these relays are connected in series from ground on the generator transfer key 132 to resistance 131 thus shunting down relay 120 and keeping it released.

Relays 122 and 123 are connected across the two output windings of ringing generator RG1 and relay 87 is connected across the alarm relay winding of the tone generator TG1, assuming it to be in service at this time.

If generator RG1 fails, either relay 122 or relay 123 or both will release. If tone generator TG1 fails, relay 87 will release. The release of any of these three relays removes shunting ground from resistance 131 causing relay 120 to operate. Relay 120, operated, locks up to ground 130 by way of its own inner right armature and front contact and the continuity contacts 129 of the relay 153. At its right armature and front contact relay 120 completes an obvious operating circuit for relay 153.

Relay 153, operated, transfers the locking ground for relay 120 to the "generator transfer" key 132 and at its No. 8 armature and front contact completes an obvious operating circuit for relay 150. Relay 150, operated, transfers the alternating-current input leads 16, 17 and the load conductors from the ringing current and tone generators RG1 and TG1 to the corresponding generators RG2 and TG2. Relay 153 also causes lamp 140 to be lighted over an obvious circuit as a guard signal and may also initiate the operation of a minor alarm signal. The contacts of relay 122 and 123 will now be open since the output windings of the ringing generator RG1 are now devoid of current. However, relay 153 at its No. 1 armature and front contact connects ground over the armature contacts of relay 87, the No. 6 armature and front contact of relay 153, the armature contact of relay 85, through resistance 133 to negative battery. Thus relay 88 is shunted down. If ringing generator RG2 or tone generator TG2 fails after the transfer, relay 85 or relay 87 will release removing the shunting ground from relay 88 and causing this relay to operate. Relay 88, operated, causes lamp 139 to be lighted over an obvious circuit and initiates the operation of a major alarm signal by way of its outermost left armature and front contact and thermistor 98. Relay 88 locks by way of its own innermost armature and front contact.

To transfer back to generators RG1 and TG1 after the trouble has been cleared, the "generator restore" key 138 is actuated to shunt down relay 120 which thereupon releases and causes relay 153 to release. The release of relay 153, in turn, causes relay 150 to release to transfer the alternating-current source input leads 16, 17 and the load back to generators RG1 and TG1 and as relays 122 and 123 reoperate under control of generator RG1, relay 120 remains shunted down when the "generator restore" key 138 is released.

*Ringing current or tone generator transfer—manual*

To manually effect the transfer of the load and the alternating-current leads 16, 17 from generators RG1 and TG1 to generators RG2 and TG2, the "generator transfer" key 132 is operated causing shunting ground to be removed from the winding of relay 120, which relay thereupon operates and causes relay 153 to operate over an obvious circuit. Guard lamp 81 also lights in a circuit including conductor 96 and the No. 2 alternate contact of key 132. Relay 153, operated, causes relay 150 to operate and to effect the transfer as previously described. In this case, however, relay 153 locks up to the "generator transfer" key 132 and relay 120 releases as soon as relay 153 operates and removes the holding ground.

To transfer back to generators RG1 and TG1, the "generator transfer" key 132 is released causing relay 153 to be deenergized and to release relay 150. Release of relay 150 transfers the alternating-current leads 16, 17 and the load back from generators RG2 and TG2 to generators RG1 and TG1.

*Interrupter transfer—automatic*

When there is no ground on conductor 14, interrupter INT1 is not operating and ground at the inner right armature and back contact of relay 12 is connected over conductor 24 to the winding of relay 51, holding this relay operated. When relay 12 is operated, the holding ground for relay 51 is removed but if the interrupter is running, relay 51 is held operated in the following manner: When interrupter INT1 is operating, the lowermost cam 11 thereof, together with the other cams illustrated is driven by motor M1 and being designed to interrupt the associated spring contacts at the rate of 120 interruptions per minute, alternately connects condenser 55 and the series resistance 56 (Fig. 1) to ground at 57 and to the winding of relay 51 over conductors 58 and 59 by way of the back contacts and armatures *z1* and *y1* of relay 23 at the same rate. This periodic connection of condenser 55 to the winding of relay 51 maintains relay 51 operated while the condenser is charging, and the slow-releasing characteristic of the relay when in parallel with condenser 60 prevents it from releasing during the interval when condenser 55 is being discharged to ground at 57.

Should the motor M1, which is driving the interrupter INT1, fail, or should the interrupter shaft 100 cease to revolve for any reason, such as a gear train failure, the 120 IPM spring pile-up controlled by cam 11 is arrested in either of two positions. If it stops when condenser 55 is connected to the winding of relay 51, the relay will remain operated until the current falls below the value of the relay holding current. If the interrupter stops with the conductor extending to the winding of relay 51 open, the relay will release after a short delay due to the parallel connected condenser 60.

Relay 51, released, completes an operating circuit for relay 62 which may be traced from negative battery, through the winding of relay 62, conductor 26, the front contact and outermost left armature of relay 61, conductor 27, outer left armature and back contact of relay 51, conductor 28, to ground at key 50. At its inner left armature and back contact relay 51 connects ground to thermistor 63 and at its outer right armature and back contact completes an obvious energizing circuit for lamp 139.

Relay 62, operated, locks in a circuit extending from negative battery through the winding of relay 62, its front contact and innermost left armature, inner left armature and back contact of relay 67, front contact and left armature of relay 70, conductor 71, and the upper normally closed contacts of key 50 to ground. At its middle left armature and front contact relay 62 causes relay 23 to operate over an obvious circuit. Relay 23 in operating transfers the load conductors from interrupter INT1 to interrupter INT2 by way of its upper armatures, and by way of its lower armatures *a1* and *b1* transfers the supply conductors 18, 19 from motor M1 of interrupter INT1 to the corresponding motor of interrupter INT2. At its outermost left armature and front contact relay 62 establishes an obvious energizing circuit for lamp 72.

At its inner left armature and back contact relay 51, released, connects ground to the thermistor 63 and thence to conductor 95 by way of the front contact and outermost right armature of relay 62. Conductor 95 extends to the alarm circuit designated ALM but no alarm is brought in because of the delay induced by the thermistor and the fact that relay 51 reoperates from the interrupter INT2 over conductors 59' and 58' which, like the corresponding leads 59 and 58 of interrupter INT1 extend to and are controlled by the spring pile-up **11*a* associated with cam 11 of interrupter INT2. The reoperation of relay 51 extinguishes lamp signal 139 and also removes the ground from the thermistor 63. In case of failure of the spare interrupter INT2, relay 51 will again release and remain released and ground will be connected over lead 95** to bring in a major alarm.

With relay 23 operated, as described, all the conductors extending to interrupter INT1 will be disconnected from the switch frame circuits X and the corresponding conductors extending to interrupter INT2 substituted therefor. Also the power leads 18, 19 are transferred from motor M1 of interrupter INT1 to the motor of interrupter INT2 so that the spare interrupter will function upon operation of relay 12 and will take over the load.

When interrupter INT1, which has failed, has been made ready for service again, it is turned manually to the position in which cam 1 thereof operates its associated springs and cam 8 does not operate its springs. This precaution is taken to prevent splitting ringing codes during a manual transfer.

To restore interrupter INT1 to service the key 50 is held operated until relay 62 restores its armatures and extinguishes lamp 72. When key 50 is operated it removes locking ground from relay 62 but a parallel ground is provided for holding the relay operated until a certain point in the rotational cycle of the interrupter is reached. This parallel holding circuit may be traced from negative battery, through the winding of relay 62, its front contact and innermost left armature, inner left armature and back contact of relay 67, conductor 68, the "motor hold" contact 66 of the spring pile-up controlled by cam 8 of interrupter INT2, conductor 97, to ground by way of the front contact and the No. 3 armature of relay 61. When the interrupter INT2 reaches the end of its code cycle, the motor hold contacts 66 open causing relay 62 to release. Relay 62, released, extinguishes lamp 72 and opens the leads to the alarm circuit ALM. It also releases relay 23 which functions, as is now apparent, to transfer the load back to interrupter INT1, to open the circuit to the motor of interrupter INT2 and to close the circuit through motor M1 of interrupter INT1.

*Interrupter transfer—manual*

To manually transfer the load from interrupter INT1 to interrupter INT2, key 80 is operated to compete an obvious operating circuit for relay 67 which relay operates and locks by way of its innermost right armature and front contact over an obvious circuit to ground at key 50. At its outermost right armature and front contact relay 67 completes a circuit for guard lamp 81 by way of conductor 96 and, at its front contact and outer left armature, connects ground over conductor 83 to the lower movable spring on the "motor transfer" pile-up 7a of interrupter INT1. When the interrupter reaches the end of its code cycle, the contacts controlled by the spring just mentioned close, connecting ground to the winding of relay 62. Relay 62 operates and locks to ground at the inner left armature and front contact of relay 67. Relay 62 then effects the load transfer from interrupter INT1 to interrupter INT2 and starts the interrupter INT2 in the manner previously described. Transfer is effected at the end of the code cycle to prevent garbling of the codes.

To transfer back to interrupter INT1, key 50 is operated and held operated until relays 67 and 62 release and lamp 72 is extinguished. Holding ground is connected from interrupter INT2 to relay 67 until the end of the code cycle in the manner described in connection with the holding of relay 62 under "Interrupter Transfer—Automatic." At that time relay 67 releases causing relay 62 to release which starts interrupter IN1 and transfers the load thereto and stops interrupter INT2.

*Dial transfer of ringing and tone generators and interrupters*

Dial transfer is resorted to under emergency conditions, such as a failure caused by an open lead or similar circumstance not detected by the automatic transfer features.

The following description is directed to a dial transfer when there has been no preceding automatic transfer of generators or interrupters. This condition assumes that the plant is running normally on ringing and tone generators RG1 and TG1 and interrupter INT1 and that some trouble has occurred that requires transfer in order to keep the involved exchange operating until the trouble can be located and cleared.

The number that has been assigned to ringing generator RG2 is dialed from any subset connected to the office, as from the station at which the dial D is located. Operation of dial D in accordance with this number sets the switches, schematically indicated at 142, so that ground potential is connected to conductor 143 and thence over the outer right armature and front contact of relay 70, front contact and the No. 6 armature of relay 61, and winding of relay 144 to negative battery. Relay 144 operates in this circuit and locks over a circuit which includes its own No. 1 armature and front contact and the No. 6 armature and front contact of relay 61. At its No. 3 armature and front contact relay 144 completes an operating circuit for relay 153 which relay operates and completes an obvious operating circuit for relay 150.

Relay 150, operated, transfers the load conductors from ringing and tone generators RG1 and TG1 to the corresponding generators RG2 and TG2.

At its No. 2 armature and front contact relay 144 connects ground by way of conductor 26 to the winding of relay 62 and thence to negative battery. Relay 62 operates in this circuit and completes an obvious circuit to relay 23 which relay thereupon operates and transfers the load from interrupter INT1 to interrupter INT2. Relay 144 also lights lamp 145 over an obvious circuit.

Relay 62 at its outermost left armature and back contact removes ground from the winding of relay 70 as does also relay 153 at its continuity contacts 149. Relay 70 releases and at its outer right armature and back contact connects ground to conductor 143 to provide a busy signal if the number is redialed, and at its inner right armature and back contact connects the winding of relay 147 to conductor 146 extending to the central office switches 142.

When the trouble has been cleared, the number assigned to ringing generator RG1 is dialed whereupon ground is connected to lead 146 extending to relay 147 causing this relay to operate. Relay 147, operated, causes relay 61 to release.

Relay 61, released, opens the locking circuit to relay 144 causing this relay to release. Relay 144 releases relay 153 which, in turn, releases relay 150. Relay 150 transfers the load conductors from generators RG2 to TG2 to generators RG1 and TG1.

Relay 144, at its No. 2 armature and front contact, opens the circuit to relay 62. Relay 62, however, does not release at this time as it is held operated in a circuit which may be traced from negative battery through the winding of relay 62, its front contact and innermost left armature, inner left armature and back contact of relay 67, conductors 68, contacts 66 of interrupter INT2, conductor 97, front contact and outer right armature of relay 51 to ground. This circuit is maintained until the end of the code cycle of interrupter INT2 and is then opened at 66, causing relay 62 to release and to restore its armatures. When relay 62 releases, it opens the operating circuit to relay 23 causing this relay to restore its armatures and thereby restore the load conductors to interrupter INT1.

When ground is removed from conductor 146 at the switches 142, relay 147 releases and operates relay 61 over an obvious circuit which includes thermistor 148. The thermistor delays the operation of relay 61 for a short interval of time. Relay 61 locks in a circuit independent of the thermistor 148. Relay 70 now operates in a circuit which may be traced from negative battery, through the winding of relay 70, the No. 4 armature and front contact of relay 61, to ground at 130 by way of the continuity contacts 149 of relay 153. Relay 70 at its inner right armature and front contact grounds conductor 146 to give a busy signal and, at its right armature and front contact extends conductor 143 to the winding of relay 144. If ground has been removed from conductor 146 before relay 62 releases, relay 147 is held operated to ground over the middle right armature and front contact of relay 62, conductor 155 and the No. 2 armature and back contact of relay 61 and will not be released until relay 62 is released by the opening of contact 66 of interrupter INT2.

*Dial transfer of interrupter after automatic transfer of ringing and tone generators*

It will now be assumed that the ringing and tone generators have undergone an automatic transfer and that it is desired to dial transfer the interrupter. After the automatic transfer, the load is being supplied by ringing and tone generators RG2 and TG2 by way of interrupter INT1. To effect the desired interrupter transfer the number assigned to ringing generator RG2 is dialed at a remote station such as indicated by the dial D.

Operation of dial D in the manner indicated results in the application of ground potential to conductor 143 and the consequent operation of relay 144. The circuit functions in the manner previously described in connection wtih a dial transfer with no preceding automatic transfer of generators or interrupters except that in this case relays 120 and 153 are locked operated due to the automatic transfer.

Relay 144, operated, locks up to its own No. 1 armature and front contact through the back contact and No. 6 armature of relay 61 and causes relay 62 to operate in a circuit extending from negative battery, through the winding of relay 62, conductor 26, to ground by way of the front contact and the No. 2 armature of relay 144. It will be noted, as above indicated, that relay 153 is already operated and locked so that relay 144, in the present case, performs no function with respect to relay 153.

Relay 62, operated, causes relay 23 to operate and transfer the load from interrupter INT1 to interrupter INT2. It also lights lamp 72.

With relays 62 and 153 operated, holding ground is removed from the winding of relay 70 so that this relay releases and connects ground to conductor 143 to give a busy signal as the number is redialed. It also closes the path from lead 146 to the winding of relay 147.

The load may be transferred back to interrupter INT1 by dialing the number assigned to ringing generator RG1 in the manner hereinbefore described except that, in this case, the load remains on generators RG2 and TG2. The transfer of the load to generators RG1 and TG1 can be effected only by the operation of the "generator restore" key 138 as previously described.

*Dial transfer of ringing and tone generators after automatic transfer of interrupter*

The automatic transfer of the load from interrupter INT1 to interrupter INT2 has been described hereinbefore. This operation left relay 62 operated and locked to ground at the "interrupter restore" key 50 by way of its own front contact and innermost left armature, the inner left armature and back contact of relay 67, the front contact and left armature of relay 70 and conductor 71.

The number assigned to ringing generator RG2 is now dialed by means of dial D causing ground to be applied to conductor 143 which, in turn, causes relay 144 to operate. Relay 144 causes relay 153 to operate which, in turn, operates relay 150. Relay 150 transfers the load from generators RG1 and TG1 to generators RG2 and TG2. Relay 144 at its No. 2 armature and front contact connects ground to the winding of relay 62 by way of conductor 26 to hold relay 62 operated after relay 70 releases and opens the holding circuit to relay 62.

The load may be restored to generators RG1 and TG1 by dialing the number assigned thereto which connects ground to conductor 146 causing the operation of relay 147. Relay 147 functions, as previously described, to release relays 61 and 144, the latter releasing relay 153 which, in turn, releases relay 150 to transfer the load back to generators RG1 and TG1.

Release of relay 144, however, does not release relay 62. The release of relay 144 removes the locking ground from relay 62 but if the interrupter is not at the end of its code cycle, the "motor hold" contacts 66 of interrupter INT2 furnishes a substitute locking circuit for relay 62. If relay 144 released at the end of the code cycle when the interrupter contacts 66 were open, relay 62 would release momentarily and then reoperate on the subsequent release of relay 51 due to the previous failure of interrupter INT1.

Should the dial D be operated following an automatic transfer of both generator and interrupter units, the circuit functions as follows: Should the lead 146 be grounded as a result of the dial operation, nothing happens in the circuit; should the lead 143 be grounded as a result of the dial operation, interrupter INT2 will stop and the relays will pump and a major alarm will be brought in. This condition clears up as soon as ground is removed from lead 143.

What is claimed is:

1. In a code ringing and tone current supply system for unattended telephone exchanges, primary and secondary current generators, an exchange load, primary and secondary interrupters for rendering available to said load the outputs of said generators in various code combinations, means responsive to a failure of the primary current generator to supply at least a predetermined potential while conditioned to supply said load by way of one of said interrupters for atuomatically transferring said load to said secondary current generator, whereby said load is supplied by said secondary current generator by way of the said one of said interrupters, and means controlled from a remote point for substituting the other of said interrupters for the said one of said interrupters whereby said load is supplied by said secondary current generator by way of the other of said interrupters.

2. In a code ringing and tone current supply system for unattended telephone exchanges, primary and secondary current generators, an exchange load, primary and secondary interrupters for rendering available to said load the outputs of said generators in various code combinations, means responsive to a failure of the primary current generator to supply at least a predetermined potential while conditioned to supply said load by way of said primary interrupter for automatically transferring said load to said secondary current generator, whereby said load is supplied by said secondary current generator by way of the said primary interrupter, and means controlled from a remote point for substituting said secondary interrupter for said primary interrupter.

3. In a code ringing and tone current supply system for unattended telephone exchanges, primary and secondary current generators, an exchange load, primary and secondary interrupters for rendering available to said load the outputs of said generators in various code combinations, means responsive to a failure of the primary current generator to supply at least a predetermined potential while conditioned to supply said load by way of said primary interrupter for automatically transferring said load to said secondary current generator, whereby said load is supplied by said secondary current generator by way of said primary interrupter, and means responsive to a failure of said primary interrupter while functioning with said secondary current generator for substituting said secondary interrupter for said primary interrupter whereby said load is supplied by said secondary current generator by way of said secondary interrupter.

4. In a code ringing and tone current supply system for unattended telephone exchanges, primary and secondary current generators, an exchange load, primary and secondary interrupters for rendering available to said load the outputs of said generators in various code combinations, means responsive to a failure of either the primary current generator to supply at least a predetermined potential or of the primary interrupter while functioning to supply said load for automatically substituting the corresponding secondary unit whereby said load is supplied from said primary generator by way of said secondary interrupter in the event of failure of said primary interrupter or from said secondary generator by way of said primary interrupter in the event of failure of said primary generator, and dial controlled means for substituting either the secondary generator or interrupter for the corresponding primary generator or interrupter not peviously automatically substituted for.

5. In a code ringing and tone current supply system for unattended telephone exchanges, primary and secondary current generators, an exchange load, primary and secondary interrupters for rendering available to said load the outputs of said generators in various code combinations, means responsive to a failure of the primary current generator to supply at least a predetermined potential for automatically substituting said secondary current generator therefor, dial controlled means for substituting said secondary interrupter for said primary interrupter, and means responsive to a failure of said primary interrupter before the operation of said dial controlled means for rendering said dial controlled means ineffective.

6. In a code ringing and tone current supply system for unattended telephone exchanges, primary and secondary current generators, an exchange load, primary and secondary interrupters for rendering available to said load the outputs of said generators in various code combinations, means whereby said load is supplied from said primary current generator by way of said primary interrupter, dial controlled means for substituting said secondary current generator and said secondary interrupter for said primary current generator and said primary interrupter respectively, and means whereby said dial controlled means functions when operated following a failure of either the secondary generator or the secondary interrupter to substitute therefor the corresponding primary element.

References Cited in the file of this patent

UNITED STATES PATENTS

| | | |
|---|---|---|
| 2,225,907 | Duguid et al. | Dec. 24, 1940 |
| 2,672,604 | Mills et al. | Mar. 16, 1954 |